United States Patent [19]

Fujiie et al.

[11] Patent Number: 4,497,047
[45] Date of Patent: Jan. 29, 1985

[54] OPTICAL DISC PLAYER WITH FOCUS CONTROL DURING SEARCH MODE

[75] Inventors: Kazuhiko Fujiie; Chiaki Nonaka, both of Tokyo, Japan

[73] Assignee: Sony Corporation, Tokyo, Japan

[21] Appl. No.: 374,704

[22] Filed: May 4, 1982

[30] Foreign Application Priority Data

May 11, 1981 [JP]  Japan ................................. 56-70416

[51] Int. Cl.³ ......................... G11B 7/00; G11B 21/12
[52] U.S. Cl. ........................................ 369/45; 369/33
[58] Field of Search ................... 369/30, 32, 33, 111, 369/44, 45, 46; 358/310, 327, 340, 342; 365/215, 234

[56] References Cited

U.S. PATENT DOCUMENTS

| | | | |
|---|---|---|---|
| 4,057,832 | 11/1977 | Kappert | 369/44 X |
| 4,106,058 | 8/1978 | Romeas et al. | 369/32 |
| 4,236,232 | 11/1980 | Jansen et al. | 369/44 X |
| 4,280,215 | 7/1981 | Okano | 369/45 |
| 4,330,880 | 5/1982 | Van Dijk | 369/32 |
| 4,337,532 | 6/1982 | Oprandi et al. | 369/45 |
| 4,375,091 | 2/1983 | Dakin et al. | 369/32 |
| 4,417,330 | 11/1983 | Hazel et al. | 369/32 |

Primary Examiner—Donald McElheny, Jr.
Attorney, Agent, or Firm—Lewis H. Eslinger; Alvin Sinderbrand

[57] ABSTRACT

In an optical disc player for optically reading information recorded in substantially parallel tracks on the surface of a rotated record disc, an optical pick-up device includes an objective lens through which a light beam is to be focused at the surface of the record disc, and such device is shiftable, as a unit, in a radial direction of the record disc for determining the track to be scanned by the focused beam, a focusing servo control is responsive to defocusing of the light beam at the record disc surface for moving the objective lens in the direction to restore correct focus of the light beam at the record disc surface, and a gain control is provided for reducing the gain with which the focusing servo control responds to defocusing when the focused beam moves transversely across a plurality of the tracks on the record disc, for example, in the searching or random access mode of operation of the player, whereby to reduce vibratory movements of the objective lens and an undesirably harsh noise that would otherwise result from the defocusing incident to relatively rapid transverse movement of the focused beam across a number of the tracks.

10 Claims, 19 Drawing Figures

FIG. 1A
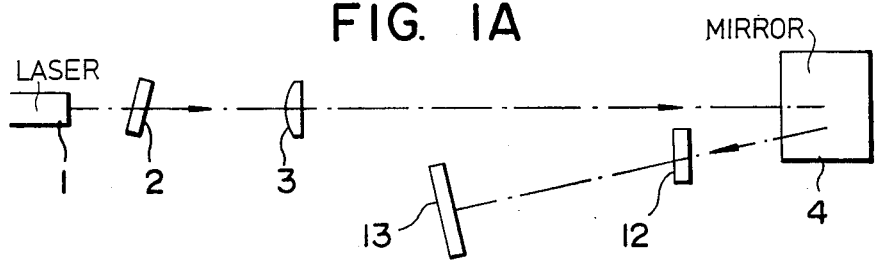
FIG. 1B
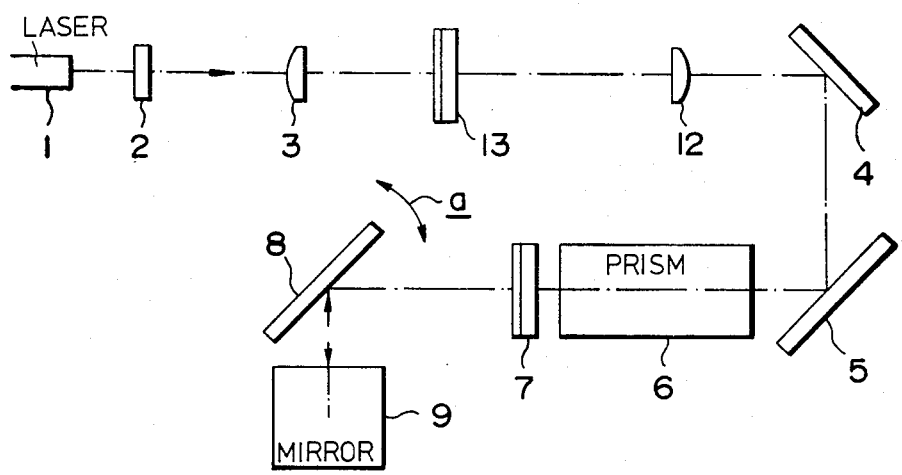
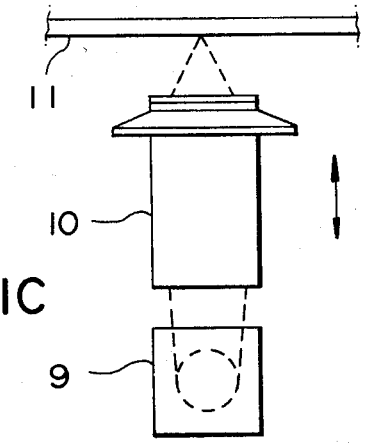
FIG. 1C

OPTICAL DISC PLAYER WITH FOCUS CONTROL DURING SEARCH MODE

BACKGROUND OF THE INVENTION

1. Field of the Invention

This invention relates generally to apparatus for optically reading information recorded in substantially parallel tracks on a record medium surface and, more particularly, is directed to improvements in an optical disc player in which a light beam is directed against a rotated record disc for optically reading information recorded in tradks thereon.

2. Description of the Prior Art

An optical disc player has been proposed for optically reproducing an information signal, such as, for example. a frequency modulated video signal or a pulse code modulated (PCM) audio signal, recorded in the form of numerous small pits arranged in a row in a spiral signal path on a rotated record disc. Such optical disc player employs an optical pick-up device or assembly including a laser generating a light beam passed through an objective lens by which the light beam is focused at the disc surface for scanning any one of the record tracks defined by successive turns of the spiral signal path. The objective lens is movable in the direction of its optical axis by an electro-magnetically applied force in response to defocusing of the light beam at the record disc surface, whereby to provide a focusing servo control for maintaining correct focus of the light beam at the disc surface. The known optical pick-up device further includes an angularly movable mirror interposed in the path of the laser light beam for deflecting the focused beam in a direction transverse of the tracks by an electro-magnetically applied force in response to detection of a tracking error, thereby to provide a tracking servo control tending to maintain the focused beam in correct tracking relation to the track being scanned thereby.

The known optical disc player is further provided with a mechanism for shifting the optical pick-up device, as a unit, in the direction of the radius of the record disc. In the normal reproducing mode, the shifting mechanism causes continuous gradual shifting of the optical pick-up device in the radial direction of the record disc so that the focused beam will continuously scan the successive tracks or turns of the spiral path in which the information is recorded on the record disc as the latter is rotated at a predetermined constant linear velocity or at a constant angular velocity. Further, in a searching or random access mode of operation of the optical disc player, the shifting mechanism is suitably controlled to rapidly shift the optical pick-up device in the radial direction of the record disc for rapidly moving the focused beam to a designated or selected radial position on the disc. During such operation of the shifting mechanism in the searching or random access mode, it will be apparent that the focused beam moves transversely across a plurality of the successive record tracks on the disc at a relatively high speed.

Operation of the above described known optical disc player in the searching or random access mode results in an undesirably harsh noise produced by vibratory movement of a portion of the structure supporting the objective lens for the focusing servo control. More particularly, when the focused beam is moved rapidly across a plurality of the record tracks, as during a searching or random access operation of the optical disc player, the focusing servo control responds to sensed rapid variations in the focus of the laser light beam and thereby causes a vibrational movement of the objective lens and of its supporting structure to produce the undesirably harsh noise.

OBJECTS AND SUMMARY OF THE INVENTION

Accordingly, it is an object of this invention to provide an improved apparatus for optically reading information recorded in substantially parallel tracks on a record medium surface, and which avoids the above-mentioned problem encountered with the prior art.

More specifically, it is an object of this invention to provide an improved optical disc player having a focusing servo control and being also capable of operation in a searching or random access mode, and which avoids the generation of undesirable noise in response to the focusing servo control during operation in the searching or random access mode.

A further object of the invention is to provide an improved optical disc player, as aforesaid, in which gain of the focusing servo control is reduced when the focused beam moves transversely across a plurality of the record tracks, whereby to ensure that undesirable noises do not result from the focusing servo control during operation in the searching or random access mode.

In accordance with an aspect of this invention, in an apparatus for optically reading information recorded in substantially parallel tracks on a record medium surface, for example, in successive turns of a spiral path on a record disc surface, optical pick-up means includes objective lens means through which a light beam is to be focused at the record medium surface and such optical pick-up means is shiftable, as a unit, transverse to the tracks for determining the tracks to be scanned by the focused beam, focusing control means is responsive to defocusing of the light beam at the record medium surface to move the objective lens means in the direction for restoring correct focus of the light beam at the record medium surface, and gain control means is provided for reducing the gain with which the focusing control means responds to the defocusing when the focused beam moves transversely across a plurality of the tracks on the record medium surface.

Preferably, in accordance with the invention, the focusing control means provides a focusing error signal corresponding to the defocusing of the light beam and being supplied to a focusing coil means associated with the objective lens means for moving the latter in the direction of its optical axis, and the gain control means includes variable gain means applying the focusing error signal to the focusing coil means and detecting means for detecting when the focused beam moves transversely across a plurality of the tracks and providing a corresponding detected output to the variable gain means by which the gain of the latter is reduced.

In one embodiment of the invention, a reproduced signal corresponding to information recorded in a track being scanned by the focused beam is applied to the detecting means which detects variations in the amplitude of such reproduced signal for providing the previously mentioned detected output when the focused beam moves from one to another of the tracks in moving transversely across a plurality of such tracks.

In another embodiment of the invention, a tracking error signal is generated in correspondence to deviation of the point of impingement of the focused beam from a transversely centered position on one of the record tracks and, in response to such tracking error signal, the focused beam is deflected relative to the remainder of the optical pick-up means in a direction transverse of the tracks so as to tend to restore the point of impingement to the transversely centered position. In this embodiment of the invention, movement of the focused beam transversely across a plurality of the tracks is detected on the basis of the level or amplitude of the tracking error signal relative to a predetermined reference voltage or level.

The above, and other objects, features and advantages of this invention, will be apparent in the following detailed description of preferred embodiments thereon which is to be read in connection with the accompanying drawings forming a part hereof, and wherein the same reference numerals are employed to identify like parts in the several views.

BRIEF DESCRIPTION OF THE DRAWINGS

FIGS. 1A, 1B and 1C are schematic views illustrating optical components of an optical pick-up device for an optical disc player of a type to which the present invention may be advantageously applied. and as seen from one side, from below and from the other side, respectively;

FIGS. 3'A, 3'B and 3'C are schematic views showing patterns of the spots formed by the light beam on the photo-detectors included in the transducer assembly of FIG. 2 for the various focusing conditions shown on FIGS. 3A, 3B and 3C, respectively;

DESCRIPTION OF THE PREFERRED EMBODIMENTS

Figure 6A:
FIGS. 6A, 6B and 6C are waveform diagrams to which reference will be made in explaining the operation of the control circuit of FIG. 5.

Referring to the drawings in detail, and initially to FIGS. 1A, 1B and 1C, it will be seen that an optical disc player of a type to which this invention may be applied includes an optical pick-up device disposed under a rotated optical record disc 11 (FIG. 1C) and being comprised of a laser 1 emitting a laser light beam substantially horizontally through a grating 2 and a spot lens 3 for reflection by a fixed upstanding mirror 4 and then again by a fixed upstanding mirror 5 so as to follow a substantially U-shaped path in a horizontal plane. After reflection from mirror 5, the laser light beam passes through a Wollaston prism 6 and a quarter-wave plate 7 for reflection at an upstanding mirror 8 which is suitably mounted for angular displacements about a vertical axis, for example, as indicated by the double-headed arrow a on FIG. 1B, so as to achieve tracking servo control, as hereinafter described in detail. The light beam reflected from angularly movable mirror 8 is further reflected by a fixed inclined mirror 9 so as to be directed upwardly through an objective lens 10 (FIG. 1C) which is intended to focus the laser light beam at a surface of record disc 11 thereabove and thereby employ the focused light beam for reading information recorded in the record tracks on such surface of disc 11. The laser light beam thus made to impinge against disc 11 is reflected from the surface of the latter, and is modulated with the information signal recorded in the track being scanned on disc 11. The reflected light beam is returned in a path extending through objective lens 10 for reflection from fixed mirror 9 and then movable mirror 8 so as to enter quarter-wave plate 7. Quarter-wave plate 7 and Wollaston prism 6 cooperate to cause the returning or reflected laser light beam to follow a returning path which is separate from the path of the incident light beam traveling toward disc 11, and which causes the returning light beam to enter a cylindrical lens 12 (FIGS. 1A and 1B) after being reflected by mirrors 5 and 4, in that order. The returning laser light beam passing through cylindrical lens 12 is guided to a light receiving device or transducer assembly 13 operating as a photo-detector responsive to the returned laser light beam to provide a reproduced information signal corresponding to the information recorded in that track being scanned on disc 11.

As shown particularly on FIG. 2, light receiving device 13 may desirably comprise four photo-diodes 14a, 14b, 14c and 14d arranged to form four light receiving quadrants which, as hereinafter described in detail, cooperate to provide the reproduced signal corresponding to the information recorded in the track being scanned, and also to indicate the relation of the focus of the laser light beam to the reflecting surface of record disc 11. Light receiving device 13 is also shown to include two additional photo-diodes 14e and 14f arranged effectively in front and in back of, respectively, the grouping or pattern of photodiodes 14a–14d and positioned at opposite sides of the median of such pattern. As hereinafter described in detail, photo-diodes 14e and 14f are provided to detect tracking errors, that is, deviations of the point of impingement of the focused laser light beam from a transversely centered position in respect to the record track being scanned on disc 11.

The detection of focusing errors will now be described with reference to FIGS. 3A, 3B and 3C and FIGS. 3'A, 3'B and 3'C. More particularly, when the laser light beam is precisely focused at the reflecting surface of optical record disc 11, as indicated on FIG. 3B, the returned laser light beam forms a circular light spot on the photo-diodes 14a–14d assumed to be positioned in the plane indicated by a dotted line 15 on FIG. 3B, with the center of such circular light spot being coincident with the intersection of the contiguous edges of the quadrants formed by photo-diodes 14a, 14b, 14c and 14d, as shown on FIG. 3'B. Thus, when objective lens 10 correctly focuses the laser light beam precisely at the reflecting surface of disc 11, all four photo-diodes 14a, 14b, 14c and 14d receive equal amounts of light so that photo-diodes 14a, 14b, 14c and 14d then have outputs $S_a$, $S_b$, $S_c$ and $S_d$, respectively, of precisely the same level.

Figure 3A:
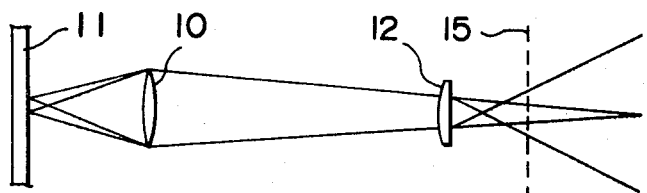
FIGS. 3A, 3B and 3C are schematic views showing various different focusing conditions, respectively, for the optical pick-up device of FIGS. 1A, 1B and 1C.
Figure 3A:
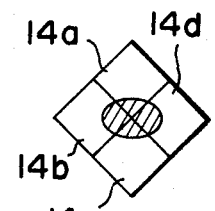
Figure 3B:
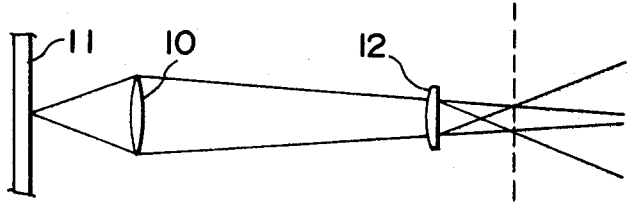
Figure 3B:
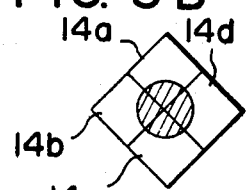

When defocusing occurs by reason of an increase in the distance to the surface of disc 11 from objective lens 10, that is, when the laser light beam is focused in front of the surface on disc 11 having the information recorded thereon, as in FIG. 3A, the astigmatism of cylindrical lens 12 causes the light spot formed by the laser light beam on photodiodes 14a–14d at plane 15 to be elliptical, for example, with the major axis of the elliptical light spot extending in the direction between the photo-diodes 14b and 14d, as shown on FIG. 3'A. Thus, in the event of the defocusing illustrated on FIG. 3A, the amount of light falling on photo-diodes 14b and 14d is greater than the amount of light falling on photo-diodes 14a and 14c. On the other hand, when defocusing occurs by reason of the disc 11 being too close to objective lens 10 so that the laser light beam is focused behind the surface of disc 11 on which the information is recorded, as shown on FIG. 3C, the light spot formed on photo-diodes 14a–14d is again elliptical but, in this case, the major axis of the elliptical light spot extends in the direction between photo-diodes 14a and 14c, as shown on FIG. 3'C. Thus, in the case of the defocusing condition illustrated on FIG. 3C, the amount of light applied to photo-diodes 14a and 14c is greater than the amount of light applied to photo-diodes 14b and 14d.

Figure 2:
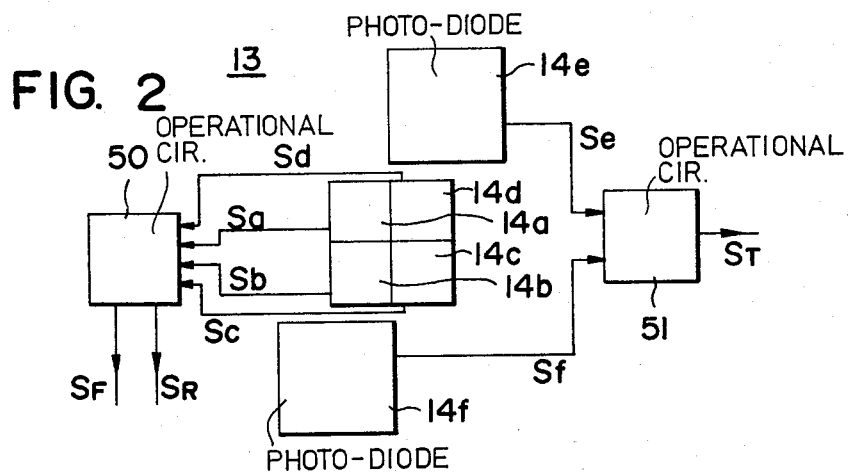
FIG. 2 is a schematic view showing the relative positional arrangement of photo-detectors in a light receiving device or transducer assembly included in the optical pick-up device of FIGS. 1A–1C.

As shown diagrammatically on FIG. 2, the outputs $S_a$, $S_b$, $S_c$ and $S_d$ of photo-diodes 14a, 14b, 14c and 14d, respectively, are supplied to an operational circuit 50 which performs operations expressed by the following equations:

$$(Sa+Sc)-(Sb+Sd)=S_F \qquad (1)$$

$$Sa+Sb+Sc+Sd=S_R \qquad (2).$$

Figure 3C:
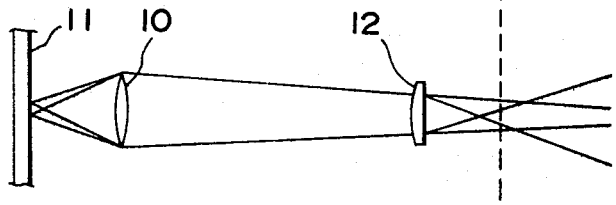
Figure 3C:
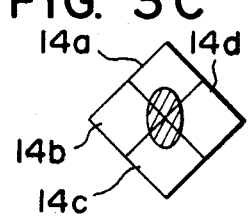

As a result of the operation indicated in equation (1), circuit 50 provides a focusing error signal $S_F$ which is zero when the laser light beam is focused precisely at the surface of record disc 11, and which has positive and negative polarities when the defocused condition of the laser light beam results from the surface of disc 11 being too close to objective lens 10, as on FIG. 3C, or too far from objective lens 10, as on FIG. 3A, respectively. As hereinafter described in detail, the focusing error signal $S_F$ is employed for effecting movements of objective lens 10 in the direction of its optical axis so as to achieve focusing servo control, that is, to maintain the focus of the laser light beam precisely at the surface of disc 11 on which the information signal is recorded.

It will be appreciated that the reproduced information signal $S_R$ is modulated by the information signal recorded on the surface of disc 11, but is essentially unchanged by the focused condition of the laser light beam.

For the detection of tracking errors in the optical disc player provided with the optical pick-up device of FIGS. 1A and 1B, grating 2 produces, from the laser light beam issuing from laser 1, two auxiliary light beams in addition to the main light beam. The main and auxiliary light beams are directed parallel to each other both on the way to the surface of disc 11 and on the return of the reflected light beams to light receiving device or transducer assembly 13. Thus, as shown on FIGS. 4A, 4B and 4C, the auxiliary light beams form auxiliary light spots 16b and 16c on the surface of disc 11 at positions which are in advance and behind, respectively, considered in the direction along a record track 17, the position of a main light spot 16a formed on the surface of disc 11 by the main light beam. Further, as shown, auxiliary light spots 16b and 16c deviate slightly, in opposite directions, from a line passing through the center of main light spot 16a parallel to the direction along record track 17. Accordingly, the positional relationships of the two auxiliary light spots 16b and 16c to signal track 17 vary in accordance with the tracking condition of the main light beam relative to signal track 17.

Figure 4A:
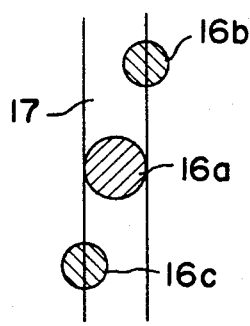
FIGS. 4A, 4B and 4C are schematic views to which reference will be made in explaining the detection of tracking errors.
Figure 4B:
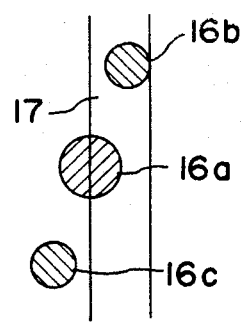
Figure 4C:
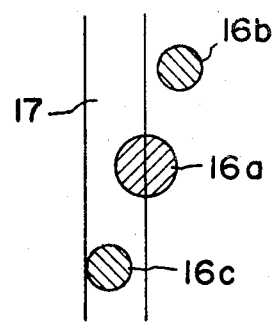

More particularly, in the correct tracking condition shown on FIG. 4A, and in which main light spot 16a is positioned precisely on signal track 17, equal fractional amounts of both auxiliary light spots 16b and 16c extend onto the opposite longitudinal edge portions of signal track 17, for example, one-half of auxiliary light spot 16b traces one edge portion of track 17 and one-half of auxiliary light spot 16c traces the opposite edge portion of track 17. When a tracking error occurs, for example, when main light spot 16a departs or deviates toward the left from the center of track 17, the full area of auxiliary light spot 16b scans track 17, while the other auxiliary light spot 16c moves completely off track 17, as shown on FIG. 4B. Conversely, when the tracking error causes main light spot 16a to deviate toward the right from the center of record track 17, then the full area of auxiliary light spot 16c traces or scans track 17, while auxiliary light spot 16b moves completely off record track 17, as shown on FIG. 4C.

The auxiliary light beams forming auxiliary light spots 16b and 16c, after being reflected by disc 11, are guided to photo-diodes 14e and 14f, respectively, of light receiving device or transducer assembly 13. The corresponding outputs Se and Sf from photo-diodes 14e and 14f, respectively, are supplied to an operational circuit 51 (FIG. 2) which performs an operation expressed by the below equation:

$$Se-Sf=S_T \qquad (3).$$

The resulting tracking error signal $S_T$ obtained from operational circuit 51 is zero when correct tracking is achieved, as on FIG. 4A. However, in the event of a tracking error, as shown on FIG. 4B or 4C, tracking error signal $S_T$ has a level and polarity corresponding to the amount and direction of the tracking error. As hereinafter further described, tracking error signal $S_T$ is employed for angularly moving mirror 8 so as to achieve tracking servo control, that is, to maintain main light spot 16a substantially centered in respect to the track 17 being scanned.

Figure 5:
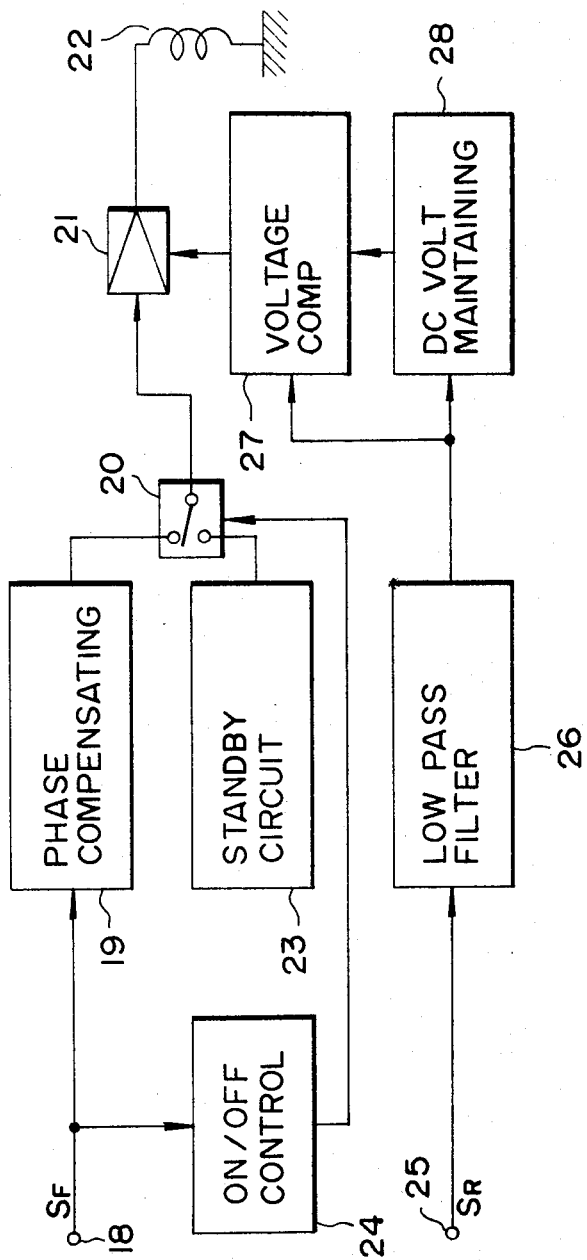
FIG. 5 is a block diagram schematically illustrating a control circuit of an optical disc player according to one embodiment of the present invention.

Referring now to FIG. 5, it will be seen that, in an optical disc player according to one embodiment of the present invention and which employs an optical pickup device as described above with reference to FIGS. 1A1C, and 2, the focusing error signal $S_F$ from operational circuit 50 (FIG. 2) is supplied to an input terminal 18 and therefrom through a phase compensating circuit 19, a switching circuit 20 (in the condition shown on FIG. 5) and a variable gain amplifier 21 to a coil 22 which forms part of a linear motor provided for moving objective lens 10 in the direction of its optical axis for achieving the previously described focusing servo control.

Switching circuit 20 is adapted to be changedover from the condition shown on FIG. 5 to a condition in which an output signal of a stand-by circuit 23 is supplied through switching circuit 20 and variable gain amplifier 21 to coil 22 in place of focusing error signal $S_F$. The foregoing arrangement is provided because the maximum range or peak-to-peak value of focusing error signal $S_F$ actually obtainable from light receiving device 13 corresponds to an axial movement of objective lens 10 of only several tens of microns. On the other hand, variations in the vertical position of the surface of rotated disc 11, for example, due to deformation of the latter, and hence the extent of defocusing encountered during actual reproducing, may be as much as ±1.0 millimeter, from which it follows that such defocusing cannot be corrected by the focusing error signal $S_F$. Therefore, stand-by circuit 23 is provided to reduce the extent of the defocusing to within a range capable of being corrected by the focusing servo control, whereupon the latter becomes operative to precisely maintain the correct focus. In order to achieve the foregoing operation, focusing error signal $S_F$ is also supplied from input terminal 18 to an ON/OFF control circuit 24 which responds to the level of the focusing error signal $S_F$ for providing a switching signal by which switching circuit 20 is controlled. More particularly, so long as the level of focusing error signal $S_F$ exceeds a predetermined value of either polarity corresponding to the range of defocusing that can be corrected by the focusing servo control, the resulting switching signal from circuit 24 causes changeover of switching circuit 20 from the position shown on FIG. 5. Upon such changeover of switching circuit 20, the output of stand-by circuit 23 is applied through switching circuit 20 and gain control amplifier 21 with the result that a corresponding current supplied to coil 22 is effective to move objective lens 10 to a position within the effective range of the focusing servo control. When objective lens 10 is thus moved to a position within the effective range of the focusing servo control, the corresponding reduction of the value or level of focusing error signal $S_F$ causes ON/OFF control circuit 24 to return switching circuit 20 to the condition shown on FIG. 5 for disconnecting stand-by circuit 23 and causing the focusing servo control to become operative, that is, to determine the amplitude and direction of the current supply to coil 22 in dependence on the level and polarity of focusing error signal $S_F$.

In the case of an optical disc player having an optical pick-up device of the type described above with reference to FIGS. 1A, 1B and 1C, it is conventional to provide, in addition to the angular movement of mirror 8 in response to tracking error signal $S_T$ for effecting tracking servo control, a mechanism for shifting the optical pick-up device, as a unit, in the direction of the radius of the record disc. In the normal reproducing or playback mode using an optical record disc having the information signal recorded thereon in a spiral path, the shifting mechanism causes continuous gradual shifting or movement of the optical pick-up device in the radial direction of the record disc so that the focused beam will substantially follow the successive tracks or turns of the spiral path on the rotated record disc, and the tracking servo control is employed for correcting those tracking errors resulting from eccentricities in the rotation of the record disc. On the other hand, in a searching or random access mode of operation of the optical disc player, the shifting mechanism is suitably controlled to rapidly shift the optical pick-up device, as a unit, in the radial direction of the record disc for rapidly moving the focused beam to a designated or selected radial position on the disc. During such operation of the shifting mechanism in the searching or random access mode, the focused beam undergoes periods of rapid transverse movement across large numbers of the record tracks on the disc, and the focusing servo control responds to resulting sensed rapid focus variations or defocusing of the laser light beam and thereby causes vibrational movement of objective lens 10 and of its supporting structure to produce an undesirable harsh noise.

Generally, in accordance with the present invention, the foregoing problem is avoided by reducing the gain with which the focusing servo control responds to defocusing in any period in which the focused beam undergoes rapid transverse movement across a large number of the tracks on the record medium surface. In other words, in accordance with this invention, the gain of variable gain amplifier 21 (FIG. 5) is reduced when it is detected that the focused beam is moving transversely across a plurality of the record tracks on record disc 11.

In the embodiment of the invention illustrated on FIG. 5, the movement of the focused beam transversely across a plurality of the tracks on record disc 11 is detected on the basis of variations occurring in the amplitude of the reproduced information signal $S_R$ from operational circuit 50 occurring when the focused beam moves from one to another of the tracks in moving transversely thereacross. More particularly, in the embodiment of FIG. 5, the reproduced information signal $S_R$, which is a relatively high frequency or RF signal so long as the focused beam is continuously scanning along the spiral path on record disc 11, is supplied through an input terminal 25 and a low pass filter 26 to a voltage comparator 27 and a DC voltage maintaining circuit 28. Voltage comparator 27 compares the voltage of the output of low pass filter 26 with an adjusted DC reference voltage from circuit 28, and the result of such comparison is used for controlling the gain of variable gain amplifier 21. Thus, the amplification of the focusing error signal $S_F$ in amplifier 21 for application to focusing coil 22 is controlled.

Figure 6B:
Figure 6C:

The operation of the above described arrangement embodying this invention will now be described with reference to FIGS. 6A, 6B and 6C. In the period when the focused beam formed by the laser light beam focused at the surface of disc 11 by objective lens 10 is tracing or scanning a track on disc 11 and in which, for example, a frequency modulated signal having a carrier frequency of 8 MHz is recorded, the reproduced information signal $S_R$ similarly has a high carrier frequency with an envelope of almost constant level. However, when the optical pick-up device is shifted radially of the disc in a searching or random access mode of operation so that the focused beam moves transversely across a substantial number of the tracks or turns of the spiral path, the amplitude of signal $S_R$ varies substantially depending on whether the focused beam is impinging on a track or on a land or portion of the record disc surface between two adjacent tracks where no signal is recorded, whereby to provide the signal $S_R$ with a component having a frequency lower than the carrier frequency, as indicated on FIG. 6A. Therefore, at the output of low pass filter 26 there will be obtained the relatively low frequency signal component, as shown on FIG. 6B, and which occurs in each period when the focused beam is rapidly moved transversely across a substantial or large number of the tracks on record disc 11. The level of such output of low pass filter 26 is compared in voltage comparator 27 with the reference DC voltage from circuit 28 and the resulting comparison output is applied to a suitable time constant circuit within comparator 27 so that a rectangular pulse signal (FIG. 6C) is applied to amplifier 21 for reducing the gain of the latter, for example, by 20 dB, so long as the focused beam is moving transversely across signal tracks on disc 11. Since the DC component of the signal $S_R$ may have slightly different levels from one disc to the next, the DC voltage maintaining circuit 28 detects the DC component of signal $S_R$ and suitably adjusts the level of the reference DC voltage which is supplied from circuit 28 to voltage comparator 27 for comparison in the latter with the output of low pass filter 26.

It will be appreciated from the foregoing that, by reason of the described reduction in the gain of amplifier 21 whenever the focused beam is moving transversely across a substantial number of the signal tracks on disc 11, the current flowing through coil 22 for moving objective lens 10 in effecting the focusing servo control is sufficiently reduced so as to restrict the movements of objective lens 10. Therefore, the previously described undesirably harsh noise is not produced during the period when the focused beam is made to move transversely across a substantial number of the signal tracks, as during a searching or random access operation of the optical disc player, and the focusing servo control is otherwise effective to ensure the maintenance of the correct focus of the laser light beam at the surface of rotated disc 11.

Figure 7:
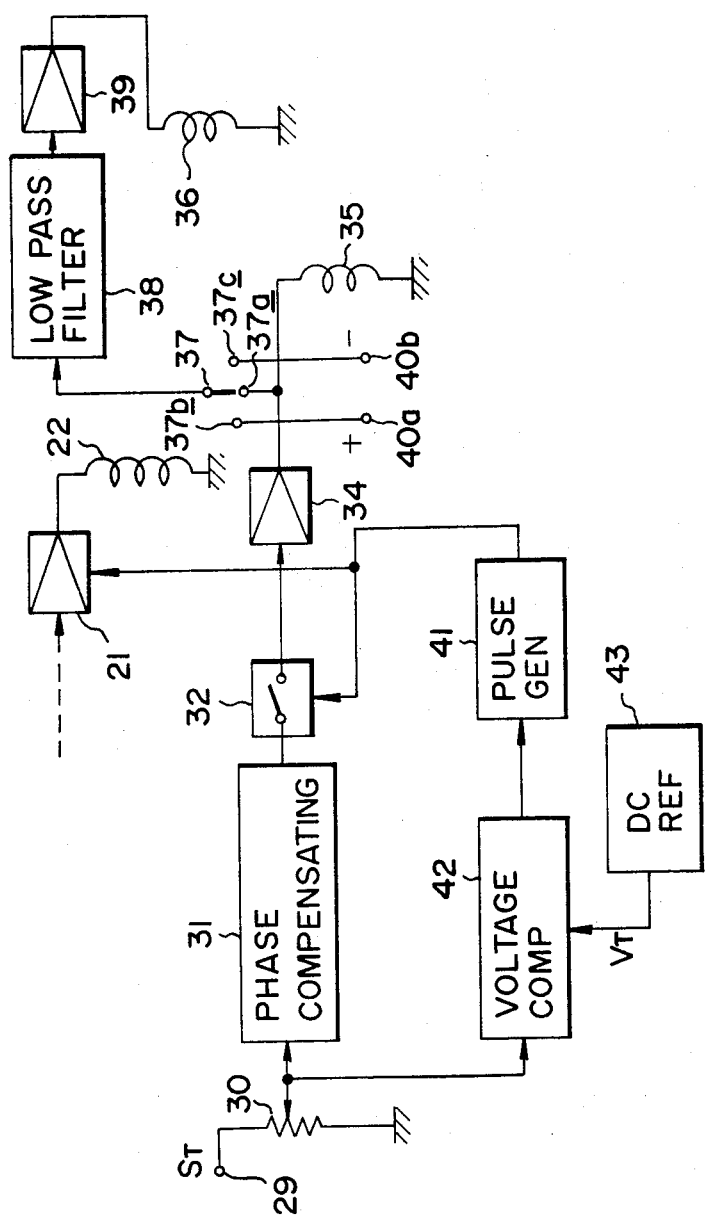
FIG. 7 is a block diagram showing a control circuit of an optical disc player according to another embodiment of the present invention.

Referring now to FIG. 7, it will be seen that, in an optical disc player according to another embodiment of the present invention, each period during which the focused beam is moving transversely across a substantial number of the signal tracks on disc 11, and during which the gain of amplifier 21 is reduced, is detected with reference to the tracking error signal $S_T$. More particularly, in the embodiment of FIG. 7, the tracking error signal $S_T$, for example, obtained from the operational circuit 51 on FIG. 2, is supplied through an input terminal 29 and a variable resistor 30 acting as a level controller, to a phase compensating circuit 31, and from the latter through a switching circuit 32 and an amplifier 34 to a coil 35 for driving the angularly movable mirror 8 and thereby effecting the tracking servo control. In the normal reproducing mode of the optical disc player, the amplitude of tracking error signal $S_T$ varies periodically in response to tracking errors caused by eccentric rotation of disc 11, and mirror 8 is angularly moved in accordance with the level and polarity of the current flowing through coil 35 in response to tracking error signal $S_T$, and thus tends to eliminate the tracking error.

In FIG. 7, the reference numeral 16 indicates a coil of a conventional motor mechanism which is provided for shifting the optical pick-up device, as a unit, in the direction of the radius of disc 11 in response to a signal supplied thereto by way of a switch circuit 37, a low pass filter 38 and an amplifier 39. More particularly, switch circuit 37 is shown to have a movable contact selectively engageable with a first fixed contact 37a connected with the output of amplifier 34, and second and third fixed contacts 37b and 37c connected with positive and negative voltage sources 40a and 40b, respectively. Switch circuit 37 is actuable to select for application to coil 36 either tracking error signal $S_T$ from the output of amplifier 34, or the positive voltage or negative voltage from source 40a or 40b, respectively, for effecting a searching or random access operation.

Further, in the embodiment of FIG. 7, a pulse generator 41 is made operative to produce a pulse in response to an output signal from a voltage comparator 42 which compares the level of tracking error signal $S_T$ from level controller 30 with the level of a reference voltage from a suitable source 43 thereof. Such pulse from generator 41 is applied to variable gain amplifier 21 for reducing the gain of the latter, and also to switch circuit 32 for opening the latter.

The control circuit of FIG. 7 operates as follows:

In the normal reproducing mode of the optical disc player, switch 37 is in the position shown on FIG. 7 and the tracking servo control is effective, in response to the tracking error signal $S_T$, to tend to reduce the latter to zero, that is, to cause the focused beam to accurately and continuously scan the successive tracks or turns of the spiral path in which the information signal is recorded on disc 11. It will be appreciated that the distance through which the focused beam can be displaced in the radial direction on disc 11 by angular movement of mirror 8 is limited, for example, to no more than 300 microns. Accordingly, in the normal reproducing mode in which switch circuit 37 has its movable contact engaged with fixed contact 37a, and so long as switching circuit 32 is in its closed state, as shown on FIG. 7, tracking error signal $S_T$ is also supplied to low pass filter 38 so that the low frequency component of signal $S_T$ is further supplied through amplifier 39 to coil 36. Thus, the motor mechanism associated with coil 36 is effective to shift the optical pick-up device gradually in the direction of the radius of the disc 11 in accordance with the low frequency component of tracking error signal $S_T$ for accommodating the spiral configuration of the path in which the information signal is recorded on disc 11, while the supplying of tracking error signal $S_T$ to coil 35 effects the tracking servo control by which small tracking errors, for example, due to eccentric rotation of disc 11, are eliminated.

When a searching or random access operation is desired, switch circuit 37 is actuated to engage either its fixed contact 37b or fixed contact 37c and thereby apply a positive or a negative voltage from source 40a or 40b through low pass filter 38 and amplifier 39 to coil 36, whereby the optical pick-up device is shifted, as a unit, at relatively high speed in the radial direction toward or away from the center of disc 11. During such relatively high speed shifting of the optical pick-up device, the tracking servo control tries to operate in the same manner as in the normal reproducing mode. Thus, as the optical pick-up device is being shifted, as a unit, the resulting tracking error signal $S_T$ is applied to coil 35 for angularly moving mirror 8 and thereby causing the focused beam to repeatedly trace a signal track on disc 11 until the maximum range of angular movement of mirror 8 has been attained, whereupon the focused beam jumps across a large number of the tracks, for example, several hundred tracks or successive turns of the spiral path on disc 11, and then begins to repeatedly trace or scan another of the signal tracks. As a result of the foregoing, in the searching mode of operation of the optical disc player, the signal recorded in the successive tracks or turns of the spiral path on disc 11 is intermittently reproduced at intervals of several hundred tracks.

Figure 8:
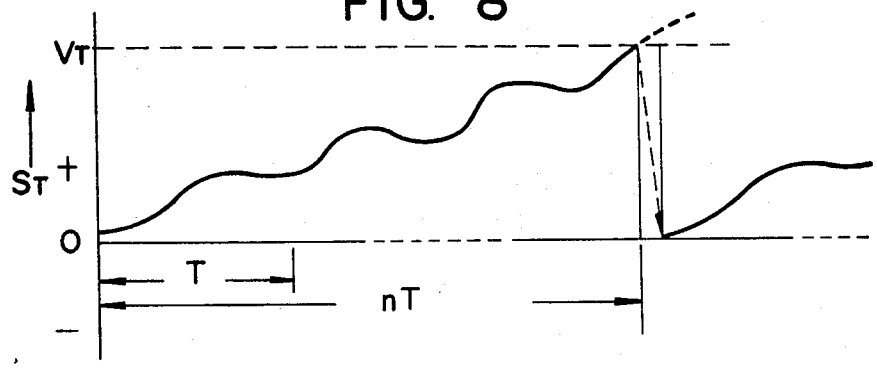
FIG. 8 is a waveform diagram to which reference will be made in explaining the operation of the control circuit of FIG. 7.

Referring now to FIG. 8, it will be seen that, in the above described searching mode of operation, the average level of the tracking error signal $S_T$ increases gradually in the period nT during which the disc 11 undergoes hundreds of revolutions, and further during which mirror 8 is progressively displaced angularly by increasing amounts so as to permit the repeated scanning of one track or turn. The variations in the level of tracking error signal $S_T$ appearing within the period T which corresponds to a single revolution of disc 11 represent tracking errors due to eccentric rotation of disc 11. In FIG. 8, such variations of tracking error signal $S_T$ due to eccentric rotation have been shown for only a few revolutions of the disc 11, but it will be apparent that a similar variation would occur for each revolution during the period nT. The tracking error signal $S_T$ shown on FIG. 8 is supplied to voltage comparator 42 for comparison therein with the reference voltage $V_t$ from source 43. When the level of tracking error signal $S_T$ exceeds reference voltage $V_t$ in the course of a searching operation, the resulting comparison output from comparator 42 causes generator 41 to provide a pulse to switch circuit 32 for opening the latter and to variable gain amplifier 21 for reducing the gain of such amplifier through which the focusing error signal is supplied to coil 22. The opening of switch circuit 32 by the pulse from generator 41 cuts off the tracking servo control, that is, interrupts the circuit through which the tracking error signal $S_T$ is supplied to coil 35 with the result that mirror 80 rapidly returns to its neutral position and causes the focused beam to move transversely across 100 to 200 signal tracks on disc 11 in a very short period, for example, in 10 to 20 milliseconds, during which the tracking error signal $S_T$ that is obtained from operational circuit 51 is merely a noise component. At the conclusion of the pulse from generator 41, switch circuit 32 again closes, with the result that the tracking servo control is initiated once more for causing the focused beam to repeatedly trace one of the tracks while the optical pick-up device is further rapidly moved in the radial direction of disc 11 in a continuation of the searching operation.

As noted above, the pulse from generator 41 is effective to reduce the gain of variable gain amplifier 21 during the period in which the focused beam moves transversely across a large number of tracks at high speed. Thus, in an optical disc player according to the embodiment of FIG. 7, as well as according to the embodiment of FIG. 5, the control gain of the focusing servo control is reduced during each period in which the focused beam moves transversely across a large number of signal tracks at high speed, as during a searching or random access operation of the optical disc player, whereby to avoid the vibrational movement of the objective lens and the undesirable harsh noise that would occur as a consequence thereof if the focusing servo control was allowed to respond to the rapid and repeated defocusing detected during each such period.

Although preferred embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In an apparatus for optically reading information recorded in substantially parallel tracks on a record medium surface: the combination of optical pickup means including objective lens means through which a light beam is to be focused at said record medium surface, and being shiftable as a unit, transverse to said tracks for determining the track to be scanned by said focused beam;

focusing control means responsive to defocusing of said light beam at said record medium surface to move said objective lens means in the direction for restoring correct focus of said light beam at said surface; and gain control means for reducing the gain with which said focusing control means responds to said defocusing when said focused beam moves transversely across a plurality of said tracks on said record medium stylus.

2. An apparatus according to claim 1; in which said record medium is a rotated disc and said parallel tracks are constituted by successive turns of a spiral path on a surface of said disc, and the shifting of said optical pickup means, as a unit, is in a radial direction of said disc.

3. An apparatus according to claim 1; in which said focusing control means includes means for providing a focusing error signal in correspondence to said defocusing of the light beam, and focusing coil means associated with said objective lens means for moving the latter in the direction of its optical axis in response to said focusing error signal; and in which said gain control means includes variable gain means through which said focusing error signal is applied to said focusing coil means, and detecting means for detecting when said focused beam moves transversely across a plurality of said tracks and providing a corresponding detected output to said variable gain means by which the gain of the latter is reduced 4. An apparatus according to claim 3; in which said optical pickup means further includes means providing a reproduced signal corresponding to information recorded in a respective one of said tracks when said focused beam scans the respective track; and said detecting means receives said reproduced signal and detects variations in the amplitude of the latter to provide said detected output when said focused beam moves from one to another of said tracks in moving transversely across a plurality of the tracks.

5. An apparatus according to claim 4; in which said detecting means includes low pass filter means receiving said reproduced signal, DC voltage maintaining means connected to said low pass filter means and producing a reference DC voltage having a level adjusted in correspondence to a DC component of said reproduced signal, and voltage comparator means comparing said reference DC voltage with the output of said low pass filter means and providing said detected output.

6. An apparatus according to claim 3; further comprising tracking control means including means for providing a tracking error signal in correspondence to deviation of the point of impingement of said focused beam from a transversely centered position in respect to one of said tracks, and means responsive to said tracking error signal for deflecting said focused beam relative to the remainder of said optical pickup means in a direction transverse of the tracks so as to restore said point of impingement so said transversely centered position; and in which said detecting means receives said tracking error signal and detects variations in the amplitude of the latter to provide said detected output when the amplitude of said tracking error signal attains a predetermined level.

7. An apparatus according to claim 6; in which said detecting means includes voltage comparator means having a source of a reference voltage and comparing said amplitude of the tracking error signal with said reference voltage to provide a compared output when said amplitude of the tracking error signal exceeds the level of said reference voltage, and pulse generating means responsive to said compared output for providing a pulse as said detected output and by which said gain of the variable gain means is reduced.

8. An apparatus according to claim 7; in which said tracking control means further includes means responsive to said pulse for rendering inoperative said means for deflecting the focused beam.

9. An apparatus according to claim 8; in which said means for deflecting the optical pickup stylus includes tracking coil means operative to cause said deflecting of the focused beam upon supplying of said tracking error signal to said tracking coil means, and said means for rendering inoperative includes normally closed switch means through which said tracking error signal is supplied to said tracking coil means, said switch means being connected with said pulse generating means and made open by said pulse.

10. An apparatus according to claim 9; further comprising drive means operative in response to a drive signal for shifting said optical pickup means, as a unit, transverse to said tracks, and means operable to selectively apply said tracking error signal and voltages of opposed polarity as said drive signal to said drive means.

* * * * *